June 5, 1945.  W. A. BLUME  2,377,317
LAMINATED HEAT-INSULATING STRUCTURE
Filed Sept. 14, 1942    2 Sheets-Sheet 1
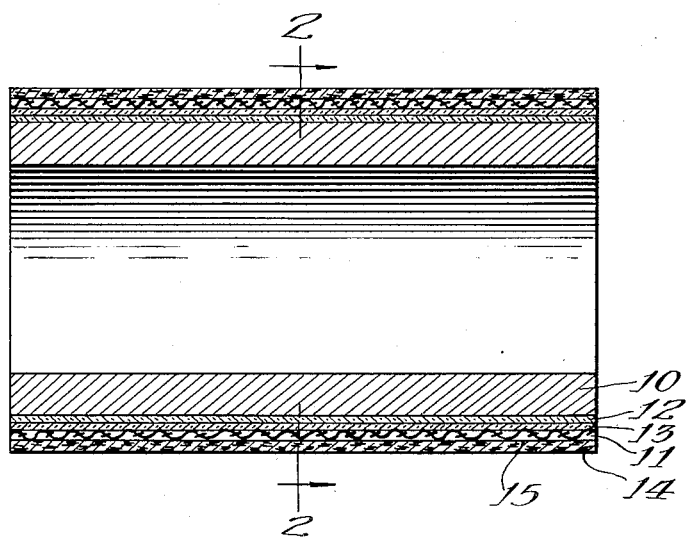
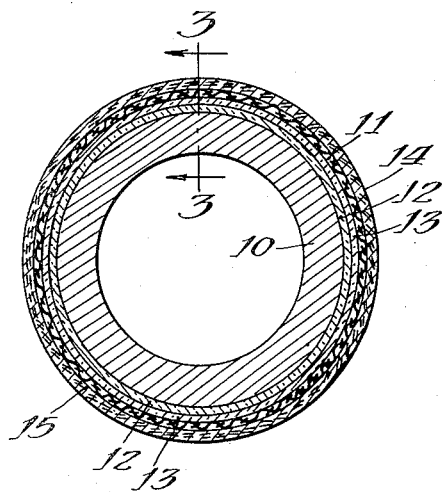
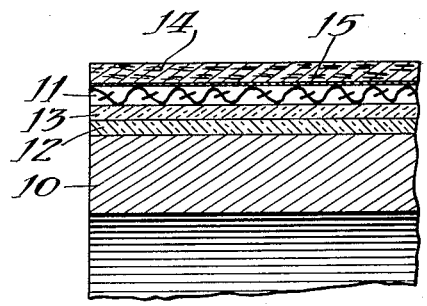
Inventor:
William A. Blume
By Wallace and Cannon
His Attorney June 5, 1945.  W. A. BLUME  2,377,317
LAMINATED HEAT-INSULATING STRUCTURE
Filed Sept. 14, 1942   2 Sheets-Sheet 2
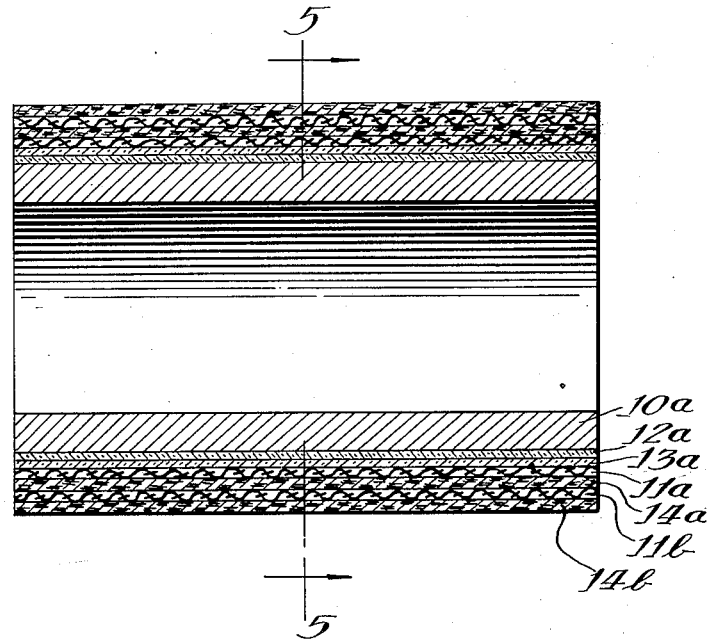
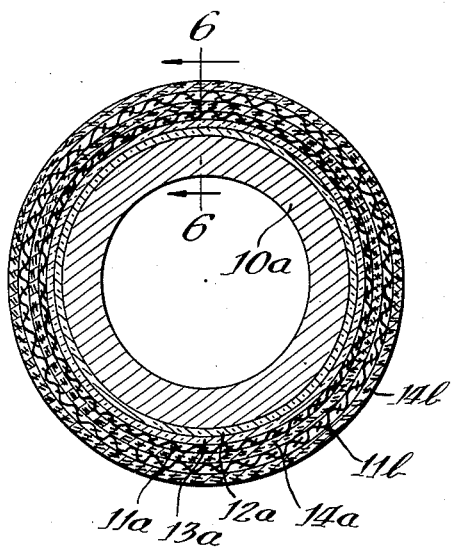
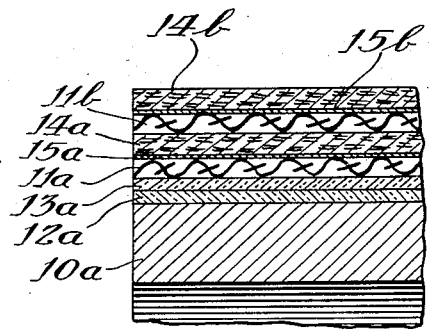
Inventor:
William A. Blume
By: Wallace and Cannon
His Attorneys Patented June 5, 1945

2,377,317

UNITED STATES PATENT OFFICE 2,377,317

LAMINATED HEAT-INSULATING STRUCTURE

William A. Blume, Farmington, Mich., assignor to American Brake Shoe Company, a corporation of Delaware Application September 14, 1942, Serial No. 458,275

8 Claims. (Cl. 154—28)

This invention relates to a composite laminated heat-insulating structure and the production thereof.

It is frequently desirable to bond the fibrous forms of glass, such as a fabric woven from glass fibers, to a metallic or like member for heat-insulating and kindred purposes, and to enable the resulting products to be handled without difficulty such, for example, as burning the user's hands, or experiencing other difficulties. Ordinary adhesives are usually not suitable for this purpose, particularly where glass fiber is to be secured to a metallic, ceramic or like surface, and hence a primary object of the present invention is to afford a new composite laminated heat-insulating construction in which glass fiber is firmly bonded to a metallic or like surface and is covered with one or more layers of heat-insulating material so that the resulting laminated heat-insulating structure may be readily handled without burning the user's hands or experiencing other difficulties.

Ceramic materials, such as porcelain enamel, have been applied heretofore to metallic and like surfaces and, as is well known, such an enamel may be firmly united with a metallic, ceramic or like surface. It has been observed that when such enamel or like material is being applied to a metallic or like surface and is in its molten state another substance may be pressed thereonto to thereby be united through and by the porcelain enamel with the surface to which the enamel is being applied. However, the melting temperatures of porcelain enamel frits customarily used to afford an enamel surface on metal and like surfaces lie well above the critical temperature of glass fibers, which is to say, the temperature at which such fibers fuse and lose their well understood characteristics. Thus, if an attempt is made to secure glass fiber to a metallic or like surface to which porcelain enamel is being applied, by pressing the glass fiber onto the enamel while it is in a molten state, the glass fiber is subjected to such a temperature that the desirable properties thereof are lost. However, since porcelain enamel is admirably suited for effecting an interconnection between a metallic or like surface and glass fibers, still another object of this invention is to enable porcelain enamel to be used for affording such an interconnection, in making the new composite laminated heat-insulating construction, and an object ancillary to the foregoing is to enable the innermost layer of glass fiber embodied in the new laminated heat insulating structure to be united with a metallic or like surface by the utilization of a porcelain enamel frit having a melting temperature below the critical temperature of the glass fiber.

It has been observed that if a porcelain enamel frit is employed which has a melting temperature below the critical temperature of glass fiber, such a frit will usually not satisfactorily unite with a metallic or like surface, but it has also been observed that such a frit will satisfactorily unite with another porcelain enamel surface, even one afforded by a frit having a melting temperature above the critical temperature of glass fiber and of such a nature that it will satisfactorily unite with a metallic or other surface. Thus, another object of this invention is to unite the innermost layer of glass fiber, which is embodied in the new composite laminated heat insulating structure, with a metallic or like member by first applying a porcelain enamel coating to a metallic or like surface and thereafter applying a second porcelain enamel coating on the first porcelain enamel coating by utilizing a porcelain enamel coating having a melting temperature below the critical temperature of glass fiber, whereby, when the frit for the second porcelain enamel coating is in its molten state, glass fiber may be pressed thereonto so as to thereby be united by the second porcelain enamel coating with the first porcelain enamel coating which, in turn, is firmly connected with the surface to which it is desired to secure the glass fabric.

Another object of the present invention is to afford a novel composite laminated heat insulating structure embodying one or more layers of heat-insulating material, which is preferably cork, and one or more layers of other heat-insulating material, which is preferably glass fiber or fabric, said layers being alternately arranged and bonded to each other and to the innermost layer of glass fiber or fabric, which is embodied in the new composite laminated heat-insulating structure, by means of a suitable heat-resistant adhesive or bonding agent which may be a heat-resistant synthetic resin of the phenolic-aldehyde type.

A further object of the invention, ancillary to the foregoing object, is to afford a novel composite laminated heat insulating structure, and a novel method of making the same, and which product will dissipate heat applied to the inner layers thereof so that it may readily be handled without danger of burning the user's hands, thus rendering the new structure particularly useful in places and in uses where a heat-insulating structure is desired such, for example, as handles on certain types of tools and cooking utensils, as gun stocks and hand rests on certain types of firearms, particularly those of the automatic or semi-automatic type, and the like.

Another object of the present invention is to afford, in one aspect thereof, a new and improved form of heat insulation which may advantageously be employed in places such, for example, as in building and refrigerator construction and the like, where manual or bodily contact with such heat insulation is normally absent or avoided.

Other and further objects of the present invention will be apparent from the following description and claims are illustrated in the accompanying drawings which, by way of illustration, show preferred embodiments and the principles thereof and what I now consider to be the best modes in which I have contemplated applying those principles. Other embodiments of the invention embodying the same or equivalent principles may be used and structural changes may be made as desired by those skilled in the art without departing from the present invention and the purview of the appended claims.

In the drawings,

Fig. 1 is a longitudinal sectional view through a composite laminated heat-insulating structure embodying the present invention;

Fig. 2 is a transverse sectional view taken substantially on the line 2—2 in Fig. 1;

Fig. 3 is an enlarged sectional detail view on line 3—3 in Fig. 2;

Fig. 4 is a longitudinal sectional view illustrating a modified form of construction of the new composite laminated heat-insulating structure;

Fig. 5 is a transverse sectional view on line 5—5 in Fig. 4; and

Fig. 6 is an enlarged sectional detail view on line 6—6 in Fig. 5.

A composite laminated heat-insulating structure such as that to which the present invention pertains may be put to a wide variety of uses among which, for example, are those instances where it is desired to provide a heat-insulating handle on certain tools and cooking utensils, upon gun stocks and hand rests on firearms, particularly those of the automatic or semi-automatic type, and the like. In certain of such instances glass fiber in the form of glass fabric may, in accordance with the present invention, be bonded to a metallic supporting surface and where the temperatures encountered are not relatively high, the heat insulation afforded by the glass fibers so retained in position may be sufficient. In other instances, as where relatively high temperatures are encountered, it is desirable, however, that other and additional heat-insulating materials be used along with the glass fiber which is bonded to the metallic supporting or like surface, and in such instances the glass fiber may be, for example, suitably supplemented by additional and superimposed heat-insulating materials which may be bonded to the layers of heat-insulating material or glass fiber, by the use of a heat-resistant adhesive such as a heat-resistant synthetic resin which may be, for example, a heat-resistant resin of the phenolic-aldehyde type.

In any event, however, it is desirable that the glass fiber be firmly joined to the metallic or other supporting surface with which it is to be used and, in accordance with the present invention, this is conveniently done by first applying to the metallic or like supporting surface a ceramic coating such as porcelain enamel. However, to afford a satisfactory surface of this character on a metallic or like surface usually requires that the frit which will afford the enamel surface, and the member affording the supporting surface, be subjected to what are called firing temperatures which are usually well above the critical temperature of glass fiber. For example, where a porcelain enamel coating is to be afforded on sheet iron, it is customary to utilize firing temperatures between 1450° F. and 1600° F.

It will be understood that the firing temperature employed will be determined by the characteristics of the member affording the surface to which the enamel is to be applied to such surface. For example, where porcelain enamel is to be applied to a ferrous supporting surface or member, frits of different characteristics are used with ferrous materials of varying iron-carbon content, and consideration is also given to other variations in the alloying element or elements in the primarily or predominantly ferrous metal. In the practice of the present invention, the application of porcelain enamel to the ferrous metal or like supporting surface is done in accordance with well understood practices.

In this regard, it is to be noted that the porcelain enamel may be applied to a metallic or like supporting surface either by what is known as the wet process or the dry process. In the wet process, as is well understood in the art, the frit is dispersed in a vehicle, usually water, whereas in the dry process the frit, in the form of a powder, is dusted onto the surface to which it is to be applied. In either event, the surface to be enameled is thoroughly cleaned, as by pickling, before the frit is appplied. Especially when the dry process is followed, the member affording the surface to be enameled may be dipped in a thin water solution of gum, such as gum tragacanth or gum acacia, and then the frit is dusted onto the surface to be enameled, for by first so dipping the member, adhesion of the frit to the surface is promoted, this being particularly advantageous where the surface is not flat. Furthermore, as is well understood in the enameling art, the articles to which the first porcelain enamel coat is to be applied may be heated prior to having the frit applied thereto, or the frit may be applied thereto and then the articles may be subjected to heat.

By way of example, in instances where a porcelain enamel frit is applied to cast iron by the wet process, in accordance with standard practices, resort need be had only to a firing temperature between 1150° F. and 1400° F. in order to afford a satisfactory porcelain enamel coating on the cast iron article. However, even temperatures in this range are above the critical temperature of glass fiber for it has been found that when glass fiber is subjected to a temperature in excess of about 1100° F., the fibrous characteristic thereof is destroyed. In some instances the glass fiber, when it is subjected to temperatures in excess of this critical temperature, fuses to the surface to which it is applied and in other instances its usefulness is impaired since it becomes brittle and is easily broken and it may even pulverize upon cooling after having been subjected to an excessive temperature.

Thus, since it is desirable that glass fiber retain its fibrous characteristics when it is used in accordance with the present invention, the glass fiber is bonded to another surface having a porcelain enamel coating thereon by utilizing a porcelain enamel frit which may be fired at a temperature well below the critical temperature of glass fiber but which will nevertheless satisfactorily unite such a porcelain enamel coating and the glass fiber.

Thus referring to the accompanying drawings, I have shown a ferrous metal member or element in the form of a cylindrical sleeve 10, as being the supporting surface, and which ferrous metal member or element 10 may be a tool handle, a cooking utensil handle, the barrel of a firearm, such as those of the automatic or semi-automatic type, or other supporting surface, a porcelain enamel coating 12 is applied to the metal supporting surface 10 in accordance with conventional practice as by dipping the sleeve 10 in a frit dispersed in water in the usual manner and thereafter firing the coated sleeve at a temperature between 1150° F. and 1400° F., depending upon the characteristics of the ferrous sleeve and the frit. After the coated sleeve has been fired for a period of from ten to fifteen minutes and sufficiently to insure that a uniform porcelain enamel coating will be provided thereon, the sleeve 10 is removed from the oven in which it has been fired and is permitted to cool.

Thereafter a second frit 13 is applied to the member, as the thus enameled sleeve 10, either by being dusted thereonto, in accordance with the above referred to dry process of porcelain enameling, or by being sprayed onto the member or by having the member dipped into a water or like solution of the frit. The glass fiber or fabric 11 which is to be bonded to the article as 10, and which may be so-called knitted glass fabric, is pressed over the frit and sufficient pressure is applied to insure that when the article having the glass fiber disposed thereabout is fired and the last applied frit 13 is rendered molten, the frit will not only fuse to the previously applied porcelain enamel coating 12 on the article but will also enable the adjacent portions of the glass fabric 11 to sink thereinto. For example, where the glass fiber 11 is in the form of fabric, sufficient pressure is applied to insure that when the last applied frit 13 is rendered molten upon firing, the fiber will sink into the molten frit in such a way that the frit will pass into the interstices in the fabric and about the interwoven strands of the fabric and particularly those adjacent the frit.

While restort may be had to a wide variety of frits to bond glass fiber or fabric to an enamel coated surface, it has been found that a typical frit which may be fired at a temperature below the critical temperature of glass fiber, is one compounded according to the following formula:

| | Percent by weight |
|---|---|
| Sodium oxide ($Na_2O$) | 8.8 |
| Lead oxide (PbO) | 64.5 |
| Silica ($SiO_2$) | 23.5 |
| Boric oxide ($B_2O_3$) | 3.2 |
| | 100.0 |

The foregoing preferred and illustrative method of bonding glass fiber or fabric to a metallic surface, and the product of said method, form the subject matter of the invention which is disclosed and claimed in the copending application of Ray E. Spokes, Serial No. 438,787, filed April 13, 1942.

In the form of the present invention which is illustrated in Figs. 1, 2 and 3, a layer of porous heat-insulating material, in the form of a layer of virgin cork 14, is applied over the layer of glass fabric 11, and is bonded thereto by means of a suitable heat-resistant adhesive material 15 which may be a heat-reactive synthetic resin such, for example, as a heat-reactive resin of the phenolic-aldehyde type.

A composite laminated heat-insulating structure is thus afforded in which heat which is applied thereto, by way of the metallic supporting or like surface 10, will be insulated and slowly dissipated or radiated so that the article on which the new composite heat-insulating laminated structure is arranged may readily be handled without difficulty such, for example, as danger of burning the user's hands. Moreover, the layer of porous heat-insulating material or cork 14 effectively insulates and slowly radiates or dissipates any heat which may be transferred thereto from the metallic surface 10 through or by way of the inner porcelain enamel bonded layer of glass fabric 11, thus effectively preventing the outermost layer 14 in the new composite laminated heat-insulating construction from becoming too hot to enable it to be handled. Further, the new composite laminated heat-insulating construction effectively prevents warm air currents from rising over the article with which it is used and this is especially important in cases where the new composite laminated heat-insulating structure is used in conjunction with the hand rest or gun stock of firearms, such as those of the automatic or semi-automatic type, since such ascending warm air currents tend to interfere with proper and effective sighting, aiming and shooting of such firearms, probably due, in part at least, to problems of light refraction caused by such ascending warm air currents.

A slightly modified form of construction of the new composite laminated heat-insulating construction is illustrated in Figs. 4, 5 and 6. This form of the invention is substantially similar to the form of the invention which is illustrated in Figs. 1, 2 and 3 but differs therefrom in that it embodies an additional layer of heat-insulating material, in the form of an additional layer of glass fiber or fabric 11b, and an additional layer of other heat-insulating material, in the form of an additional layer of virgin cork 14b, which is arranged over and outwardly of the additional layer of glass fabric 11b and is bonded thereto by means of a suitable heat-resistant adhesive such, for example, as by means of a heat reactive synthetic resin 15b of the phenolic-aldehyde type.

The form of construction illustrated in Figs. 4, 5 and 6 will be found particularly useful where greater heat-insulating properties are desired than may be present or inherent in the form of construction which is illustrated in Figs. 1, 2 and 3 as, for example, where the new composite laminated heat-insulating and construction is to be used in conjunction with or as a hand rest or gun stock on firearms, including those of the automatic or semi-automatic type, and the like, since in such cases the so-called "breathing" or heat-dissipating properties of the layers of cork are particularly useful in dissipating the heat transmitted from the surface 10a so as to cool the outermost layer of cork or other heat-insulating material 14b sufficiently to enable it to be readily handled while, at the same time, preventing the structure from being heated to a temperature where it would cause undesirable rising hot air currents, as pointed out hereinbefore.

Except as thus distinguished, the form of construction which is illustrated in Figs. 4, 5 and 6 is substantially and otherwise similar or identical to the form of construction which is shown in Figs. 1, 2 and 3 and hence need not be described in detail again herein. Accordingly, those parts and component layers which are embodied in the form of construction which is shown in Figs. 4, 5 and 6, and which are identical to corresponding parts or component layers in the form of the invention which is illustrated in Figs. 1, 2 and 3, have been given the same reference numerals, followed by the additional and distinguishing reference character a.

If desired, of course, additional alternately arranged layers of heat-insulating material or glass fabric and additional layers of other heat-insulating material or cork may be embodied in or added to the form of construction shown in Figs. 4, 5 and 6 and the invention is not limited to any specific numbers of such alternately arranged layers of heat-insulating materials.

If desired, the single layer or the several layers of cork which are embodied in the forms of the new heat-insulating material which are shown in Figs. 1 to 3 and in Figs. 4 to 6, inclusive, respectively, may be replaced by one or more layers of wood veneer or other similar or equivalent porous heat-insulating material, in places such, for example, as in building and refrigerator construction where manual or bodily contact with such heat-insulation is normally absent or avoided.

From the foregoing description, considered in conjunction with the accompanying drawings, it will be seen that the present invention affords a novel and efficient composite laminated heat-insulating construction, and a novel and efficient method of making the same, and hence accomplishes its intended objects and has the desirable advantages and characteristics, including those herein pointed out, and others which are inherent in the invention.

While I have illustrated and described selected embodiments of my invention, it is to be understood that these are capable of variation and modification and I, therefore, do not wish to be limited to the precise details set forth, but desire to avail myself of such changes and alterations as fall within the purview of the following claims.

I claim:

1. The improvement in the art of making a composite laminated heat-insulating structure which resides in bonding glass fabric to a supporting surface by means of successively applied coatings of porcelain enamel, the last or outermost of which coatings of porcelain enamel fuses at a temperature somewhat below the fusing point of glass fabric, and then adhesively securing a layer of other heat-insulating material over said layer of glass fabric.

2. The improvement in the art of making a composite laminated heat-insulating structure which resides in bonding glass fabric to a supporting surface by means of successively applied coatings of porcelain enamel, the last or outermost of which coatings of porcelain enamel fuses at a temperature somewhat below the fusing point of glass fabric, arranging a layer of virgin cork over said layer of glass fabric and securing said layer of virgin cork to said layer of glass fabric by means of heat-reactive resinous material.

3. The improvement in the art of making a composite laminated heat-insulating structure which resides in bonding glass fabric to a supporting surface by means of successively applied coatings of porcelain enamel, the last or outermost of which coatings of porcelain enamel fuses at a temperature somewhat below the fusing point of glass fabric, then arranging a layer of virgin cork over said layer of glass fabric and bonding said layer of virgin cork to said layer of glass fabric by means of heat-reactive resinous material, adhesively securing another layer of glass fabric over said layer of virgin cork, and then adhesively securing another and outermost layer of virgin cork over said last applied layer of glass fabric.

4. The improvement in the art of making a composite laminated heat-insulating structure which comprises applying an inner layer of heat-fusible ceramic material to a metallic surface, fusing said layer of heat-fusible ceramic material to said metallic surface, applying a second layer of heat-fusible ceramic material over said inner layer of heat-fusible ceramic material, said second layer of heat-fusible ceramic material being characterized by having a fusing or melting point substantially below the fusing or melting point of glass fiber, applying a layer of glass fabric over said second layer of heat-fusible ceramic material, heat fusing said second layer of heat-fusible ceramic material to said inner layer of heat-fusible ceramic material and, simultaneously therewith, heat fusing said layer of glass fabric to said second layer of heat-fusible ceramic material.

5. The improvement in the art of making a composite laminated heat-insulating structure which comprises applying an inner layer of heat-fusible ceramic material to a metallic surface, fusing said layer of heat-fusible ceramic material to said metallic surface, applying a second layer of heat-fusible ceramic material over said inner layer of heat-fusible ceramic material, said second layer of heat-fusible ceramic material being characterized by having a fusing or melting point substantially below the fusing or melting point of glass fabric, applying a layer of glass fabric over said second layer of heat-fusible ceramic material heat-fusing said second layer of heat-fusible ceramic material to said inner layer of heat-fusible ceramic material and, simultaneously therewith, heat fusing said layer of glass fabric to said second layer of heat-fusible ceramic material, and then arranging a layer of porous heat-insulating material over said layer of glass fabric and bonding said layer of porous heat-insulating material to said layer of glass fabric by means of heat-resistant adhesive material.

6. A composite laminated heat-insulating structure comprising a layer of glass fabric adapted to be bonded to a supporting surface, means, in the form of successively applied coatings of porcelain enamel, bonding said layer of glass fabric to said supporting surface, the last of said coatings of porcelain enamel being characterized in that it fuses at a temperature somewhat below the fusing point of glass fabric, and a layer of heat-insulating material bonded to said layer of glass fabric by means of heat-resistant adhesive material.

7. The composite laminated heat-insulating construction defined in claim 6 which includes at least one additional layer of glass fabric bonded to said layer of heat-insulating material and one additional layer of said heat-insulating material bonded to said additional layer of glass fabric, and in which said additional layers of glass fabric and heat-insulating material are bonded to each other, and in which said additional layer of glass fabric is bonded to the underlying layer of heat-insulating material, by means of heat-reactive resinous material, with said additional layer of heat-insulating and heat-dissipating material arranged as the outermost layer in said composite heat-insulating structure.

8. The composite laminated heat-insulating structure defined in claim 6 in which said layer of heat-insulating material is virgin cork.

WILLIAM A. BLUME.